Feb. 13, 1934.  W. Z. LINDERS  1,947,208
COUPLING
Filed April 20, 1933
FIG. 1.
FIG. 2.
FIG. 3.
FIG. 4.
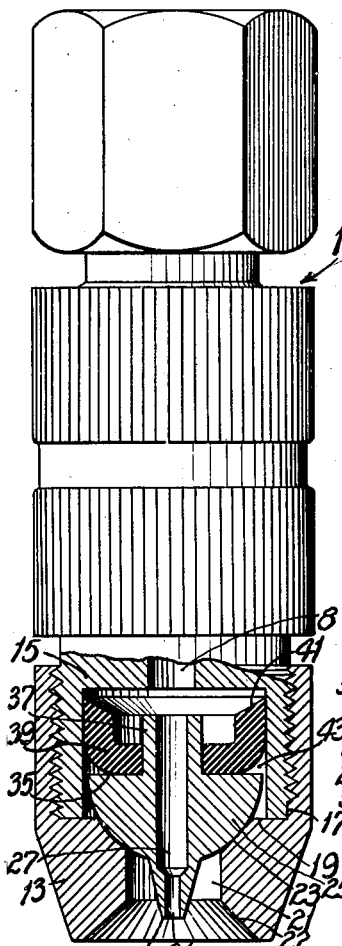
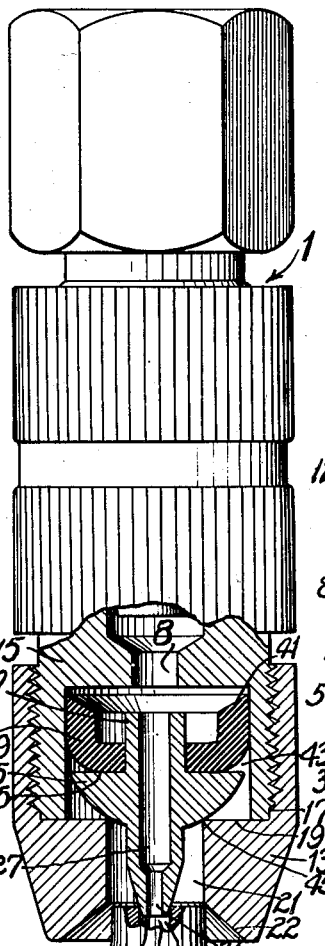
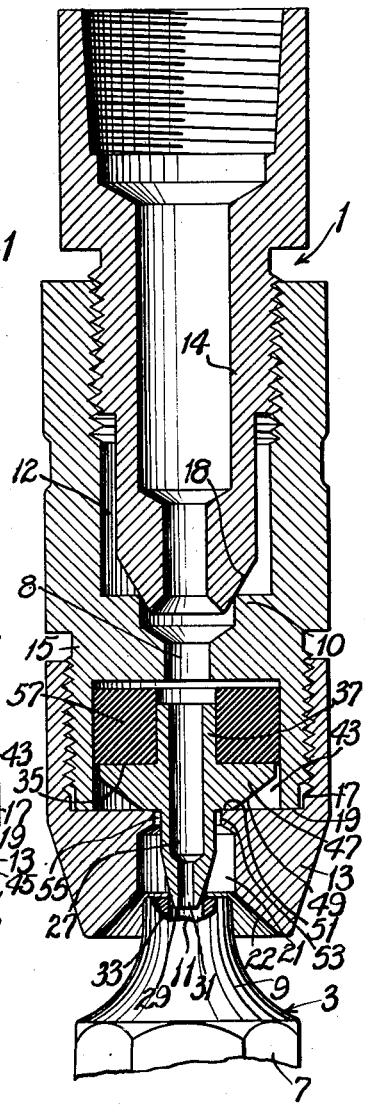
William Z. Linders,
Inventor.
Delos G. Haynes,
Attorney.

Patented Feb. 13, 1934

1,947,208

UNITED STATES PATENT OFFICE 1,947,208

COUPLING

William Z. Linders, Normandy, Mo., assignor to Lincoln Engineering Company, St. Louis, Mo., a corporation of Missouri Application April 20, 1933. Serial No. 666,969

3 Claims. (Cl. 285—161)

This invention relates to couplers and with regard to certain more specific features, to improved couplers for pressure lubrication, the same being an improvement upon the invention set forth in patent application of Alexander P. Fox and myself, Serial No. 651,290, filed January 12, 1933, for Couplers.

Among the several objects of the invention may be noted the provision of a push-type of coupler, in which automatic sealing against pressure, according to pressure, will be obtained at the same time that flexibility of the nozzle thereof is effected; and the provision of apparatus of the class described which shall be compact in form and simple in construction. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which are illustrated several of various possible embodiments of the invention, Fig. 1 is a side elevation, parts being broken away to show a vertical section of one form of the invention;

Fig. 2 is a view similar to Fig. 1 but showing another form of the invention;

Fig. 3 is a vertical section showing a third form of the invention; and,

Fig. 4 is a fragmentary view illustrating by way of example, the operation of the form shown in Fig. 2.

Similar reference characters indicate corresponding parts throughout the several views of the drawing.

Referring now more particularly to the drawing, there is shown at numeral 1 a coupler applicable by an axial force to a fitting 3 to effect a connection or seal between the coupler and the fitting, said fitting and coupler being adapted to be used more particularly in high pressure lubrication systems, although being also useful with lower pressures.

The fitting 3 comprises a hollow member provided with threads at one end as shown at numeral 5, for threading the fitting into a bearing member to be lubricated. The fitting 3 is also provided with a wrench receiving, polygonal portion 7, and at its other end with a truncated portion 9. The inlet of the fitting 3 is shown at numeral 11 and is ordinarily of the order of $\frac{1}{16}$ to $\frac{1}{8}$ inch in diameter.

The coupler 1 comprises a sleeve 13 and a body 15. The sleeve 13 has a counterbore 17 which terminates at a shoulder 19 with which a concentric opening 21 communicates. The opening 21 is flared as at 22 to freely receive the truncated portion 9 of the fitting 3. The body 15 is threaded into the sleeve 13, the shoulder 19 functioning as a stop.

The cylindric opening 21 and the shoulder 19 are joined by means of a spherical socket 23 into which seats a ball flange 25, thus forming a ball-and-socket joint. The flange 25 forms a radial portion of a hollow nipple 27, the latter having a tapered, needle-like end 29 with a small opening 31 therein. The end of the nipple 29, including the opening 31 therein, is small enough to be inserted within the receiving opening 33 of said fitting 3.

The flange 25 is for the purpose of providing greater flexibility for the needle 29 when it is desired to have the coupler angularly located with respect to the coupling as a whole (see Fig. 4).

Referring to Fig. 1, it will be seen that the flange 25 is provided rearwardly with a flat portion 35 and with a hollow extension 37. Upon the extension 37 is carried a cup-shaped, self-sealing gasket 39 having one portion of its L-shaped cross section provided with a feather edge 41 which bears against the lateral wall of the hollow portion 43 in the body 15. The other leg of the L-shape rests upon the flat surface 35.

From the above it will be seen that the gasket 39 not only provides flexibility of connection between the nipple 27 and the body 15, permitting movement of the nipple 27, but also provides increasing sealing effect with increasing pressure above the gasket.

In Fig. 2 corresponding reference numerals indicate corresponding parts, the primary change being in the shortening of the spherical flange 25 and elimination of the spherical portion to form a sharp edge 45 upon which the spherical portion 25 normally rests. This form of the invention will not resist swiveling action to the extent of the form shown in Fig. 1. It also permits of less expensive manufacturing. In Fig. 4 is shown an angular relation between the body 15 and the nipple 27 (see center lines A and B), and the figure also illustrates the further angularity which may be effected between the center line B and the center line C of the fitting 3. The sum of the two angles at A—B and B—C is the total angle of A—C between the center line of the body and that of the fitting. This figure also shows how the gasket 39 adapts itself to the angularity.

In Fig. 3 is shown a third form of the invention in which like numerals also designate like parts. In this form of the invention, instead of using a spherical flange, I prefer to use a flange 47 which has the rearwardly flat portion 35 to conform to the form of Fig. 1 but which, instead of having a spherical seat, is provided with a bevel 49 and a flat portion 51, the latter resting on the flat bottom of the chamber 43. Furthermore, the opening 21 is formed with a flange 53 between which and the needle 29 is a space 55 permitting angularity.

Back of the flange 47 is a solid but relatively soft packing 57 composed of a suitable material or composition such as alternate layers of canvas and rubber. The composition effects a radial expansion when stresses are applied parallel to its axis. Other relatively soft packings may also be used.

The operation of the form of the invention shown in Fig. 3 is to push the nipple 27 directly into the opening of the fitting 3 being guided by flare 22. Should the fitting be entered at an angle the nipple 27 will adjust its position to partially conform to the angle of the fitting sufficiently so as to insure a pressure seal between opening 33 and the nipple end 29. The adjusted position of the nipple 27 will not be disturbed as internal pressure is applied above the flange 47. In adjusting itself the nipple 27 assumes an angular position with respect to the body 15. It rocks the flat portion 51 of the flange 47 upon its seat, the washer 57 taking up the required play. Furthermore, as internal pressure is applied above the flange 47, the gasket 57 tends to effect a better seal. This construction has the advantage of insuring positive parallel center-line relationship between the body 15 and the nipple 27, the same being determined by the right-angularity between the surface 51 and the center line of said nipple 27. After internal pressure has been relieved by withdrawing nipple 27 from fitting 3 this center line relationship has the advantage of straightening the nipple 27 for application to another fitting similar to fitting 3.

The body 15 (Fig. 3) above the position of the nipple 27 is provided with a passage 8, a shoulder 10, and a threaded recess 12, into which recess is threaded a second larger form of nipple 14, the latter threadably receiving tubing which communicates with known pressure lubricating system or apparatus. The nipple 14 has a bevelled lower end 18 adapted to cooperate with said shoulder 10 to effect a seal. Either the nipple 27 or the nipple 14 may be used in lubricating, depending upon the fitting to be served.

Due to line contact of relatively small circumferential length of shoulder 10 and bevel 18, friction is reduced to a minimum to facilitate screwing the body 14 by manual effort sufficiently tight to insure a leak-proof connection or seal between shoulder 10 and bevel 18.

A further purpose of the large nipple 14 is to clean the small nipple 27 in the event it should become clogged which eliminates the necessity of a strainer. This is accomplished by unscrewing the nipple 14 from the body 15 and inserting the beveled end 18 into the flare 22. The bevel 18 contacts the inward edge of flare 22 effecting a leak-proof connection or seal which can be maintained by manual effort while sufficient pressure is developed in the interior of nipple 14 to force the obstruction from nipple 27.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A coupler comprising a body having a hollow interior and an exterior opening communicating therewith, a hollow nipple extending into said opening, said nipple having a flange within the opening, a seat on the body portion beneath said flange, and resilient packing means between said nipple and the walls of said hollow interior, the seat and the flange being relatively flat at the region of the engagement, the seat being formed to permit passage therethrough of the nipple and rocking of the flange on said flat seat, said flange having a conical relieved portion adapted to permit rocking about a point substantially within the periphery of the flange and hence without excessive lifting of the packing.

2. A coupler for fittings with relatively small openings, comprising a body having a hollow interior portion and a relatively small exterior opening communicating with said hollow interior, said opening being surrounded by an inward flange on the body portion, a flanged nipple extending through said opening and adapted to enter said relatively small fitting openings, said body flange comprising a support for the nipple flange, the nipple and the body portion having relative rocking movement at said support, and having relatively flat engaging surfaces, a conical relieved portion on the nipple flange adapted to determine rocking movement substantially on said body flange, and a resilient washer engaging the hollow interior and said nipple flange, whereby movement of the nipple with respect to the body is possible without deleterious distortion of the washer and hence at the same time a proper seal between the body and the nipple.

3. A coupler for fittings having relatively small openings, comprising a body having a hollow interior and a relatively small exterior opening communicating therewith, a hollow nipple extending through said opening and adapted to enter said fitting openings interiorly, said nipple having a flange within said interior, a flange seat on the body portion beneath said flange, and forming said exterior opening, and resilient packing means between said nipple and the walls of said hollow interior, said nipple being subjected to internal fluid pressure only, the seat and the nipple flange being relatively flat at the region of engagement and held in engagement only by said pressure, said flat engagement and packing permitting rocking of the nipple and ensuring centralizing of the nipple upon disappearance of the cause of rocking, said nipple flange being cut away conically to determine rocking well within the periphery of the nipple flange.

WILLIAM Z. LINDERS.